J. A. GREENE.
Fastening Rubber Tires on Carriage Wheels.
No. 84,878. Patented Dec. 15, 1868.
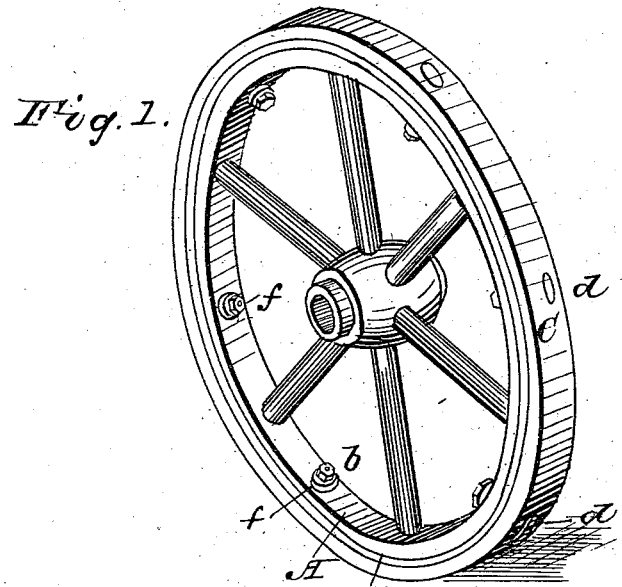
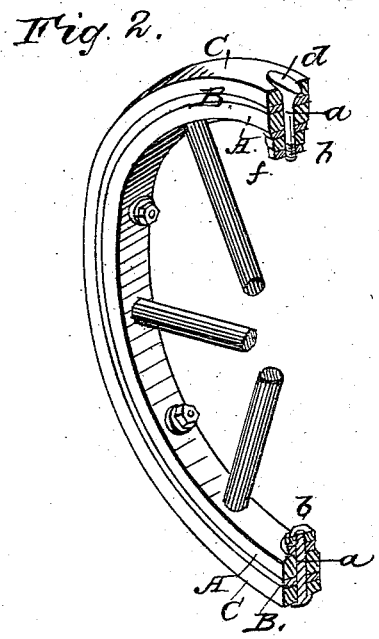
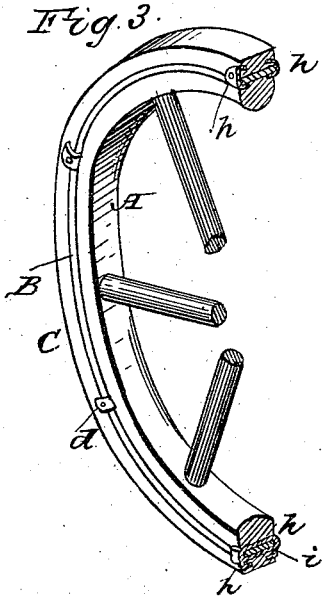

United States Patent Office.

J. ASHTON GREENE, OF BROOKLYN, NEW YORK.

*Letters Patent No. 84,878, dated December 15, 1868.*

MODE OF FASTENING INDIA-RUBBER TIRES ON CARRIAGE-WHEELS.

The Schedule referred to in these Letters Patent and making part of the same.

*To whom it may concern:*

Be it known that I, J. ASHTON GREENE, of Brooklyn, in the county of Kings, and State of New York, have invented certain new and useful Improvements in Attaching India-Rubber Tires to Carriage-Wheels; and I hereby declare the following to be a full, clear, and exact description of the same, reference being had to the accompanying drawings, in which—

Figure 1 is a perspective view of a wheel to which my improvements are applied.

Figure 2 is a sectional perspective view of the same, exhibiting more clearly the means employed for uniting the rubber tire with the wheel.

Figure 3 is a like view of a wheel, representing a modification of the fastening-device for uniting the rubber tire with the rim of the wheel.

India-rubber tires have heretofore been applied to the wheels of vehicles, but only by the employment of means, in many respects, unsuitable for common and general use, for the reason that the methods devised have required a special form of metal tire, with flanges on each side for holding the rubber. Such tires are not only expensive, but cannot be used as ordinary tires, so that when once applied to wheels, the latter are unfitted for use without auxiliary rubber tires.

My invention, which is intended to obviate the above-recited and other defects, consists in the method of attaching an India-rubber or elastic tire to the ordinary metal tire of a wheel, by means of nuts, bolts, and springs, clasps, or other removable and adjustable fastening-devices, so that the wheel may be adapted for use either with or without the rubber tire.

Under my invention, the bolts for holding the rubber tire to the wheel pass through both the rubber and metal tires and the wooden rim.

As the compression of the rubber at the point where the wheel rests on the ground will be greater than at other points on the wheel, the bolt and nut at that point will be apt to become loose, unless prevented by suitable means, and to this end I combine, with the bolt, a spring, of rubber or its equivalent, in such manner that whether the compression of the rubber tire be greater or less, the bolt will always be held tightly and securely in its proper position, thus preventing not only jarring or rattling, but also the displacement of the rubber tire.

To enable others skilled in the art to understand and use my invention, I will now proceed to describe the manner in which the same is or may be carried into effect, by reference to the accompanying drawings.

The felloe or rim, A, of the wheel, and the flat metal tire B, are of ordinary construction, and are united together in the usual manner.

Around the exterior of the metal tire, I place the rubber tire C, which is attached to the former by means of the bolts and nuts *a b*, figs. 1 and 2, or the clasps *h*, fig. 3, or equivalent detachable fastening and tightening-devices.

Under the arrangement shown in figs. 1 and 2, the bolts *a*, provided with broad flat heads *d*, are passed through holes made in the rubber and metal tires and felloe, and are then secured in position by means of nuts *b*, which are screwed up against the felloe, until the heads, *d*, are drawn tightly down upon the rubber tire.

As that part of the rubber which rests on the ground will naturally be compressed to a greater extent than it is on the other parts of the wheel, and as the bolts and nuts may thereby become loosened, I interpose between each nut and the felloe, against which it would otherwise bear, a disk, *f*, of India-rubber, or equivalent spring, encircling the bolt. As this spring-disk is compressed when the nut is tightly screwed up against it, it follows, when the rubber tire is compressed, and the pressure or hold of the nut is consequently relaxed, that the spring-disk will expand in the direction of the nut, which, together with the bolt, will be held tightly and firmly in position.

Instead of using the bolts and nuts *a b*, I can employ the clasps or clamps *h*, seen in fig. 3. These clamps may be made either in one or two pieces, the latter construction being shown in the drawings.

One end of the clamp catches, and is secured under the metal tire or the felloe, and the other extends around, and is inserted from the side into the body of the rubber tire. They are arranged in pairs, opposite each other, each pair constituting, in effect, a set of jaws, held together by a bolt, *i*, the ends of which pass through and are riveted or otherwise suitably secured to the clamps.

Instead of the foregoing devices, other equivalent, adjustable, and removable clasping or clamping-devices may be employed, which will hold the parts together, leaving, at the same time, the metal tire unimpaired, and in condition to be used at any time by simply removing the rubber tire and fastening-devices; and this feature constitutes the chief merit of my invention, for, while there is but little expense involved, I can convert the elastic-tired wheel into an ordinary wheel, or *vice versa*, with the greatest ease and expedition.

Having now described my invention, and the manner in which the same is or may be carried into effect,

What I claim, and desire to secure by Letters Patent, is—

1. The method of attaching an India-rubber tire to the ordinary flat metal tire of a wheel, by means of detachable and removable fastening-devices, substantially as and for the purposes herein described.

2. The herein-described bolts, nuts, and springs for holding together the rubber and metal tires, the same being arranged and applied to the wheel, substantially as shown and set forth.

In testimony whereof, I have signed my name to this specification, before two subscribing witnesses.

J. ASHTON GREENE.

Witnesses:
HENRY A. TWEED,
JOHN HENRY McCOY.